(12) United States Patent
Coburn et al.

(10) Patent No.: US 9,042,055 B2
(45) Date of Patent: May 26, 2015

(54) GROOVED TAPE GUIDE ROLLER

(71) Applicant: Oracle International Corporation, Redwood City, CA (US)

(72) Inventors: Peter R. Coburn, Lafayette, CO (US); Daniel W. Underkofler, Lafayette, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 68 days.

(21) Appl. No.: 13/934,257

(22) Filed: Jul. 3, 2013

(65) Prior Publication Data
US 2015/0009792 A1    Jan. 8, 2015

(51) Int. Cl.
*G11B 15/28* (2006.01)
(52) U.S. Cl.
CPC ........................... *G11B 15/28* (2013.01)
(58) Field of Classification Search
USPC .......................................................... 360/250
See application file for complete search history.

(56) References Cited

U.S. PATENT DOCUMENTS

| | | | |
|---|---|---|---|
| 5,088,172 A | | 2/1992 | Daly |
| 5,199,168 A | * | 4/1993 | Daly ............................ 29/895.3 |
| 6,320,727 B1 | * | 11/2001 | Cope et al. ............... 360/130.21 |
| 6,745,976 B1 | * | 6/2004 | Marion ....................... 242/615.4 |
| 6,994,293 B1 | * | 2/2006 | Coburn ....................... 242/615.2 |
| 7,116,520 B2 | * | 10/2006 | Tanaka ..................... 360/130.21 |
| 7,261,250 B1 | | 8/2007 | Underkofler et al. |
| 8,054,577 B2 | * | 11/2011 | Eaton et al. ...................... 360/83 |
| 8,755,151 B2 | * | 6/2014 | Argumedo et al. ...... 360/130.21 |

* cited by examiner

*Primary Examiner* — Wayne Young
*Assistant Examiner* — Mark Blouin
(74) *Attorney, Agent, or Firm* — Brooks Kushman P.C.

(57) ABSTRACT

A tape guide roller, for use with a tape drive that is configured to receive a length of tape, includes a roller body having an outer surface with one or more grooved areas and one or more non-grooved areas. The one or more grooved areas make up seventy-five percent or less of the outer surface, and the one or more non-grooved areas make up at least twenty-five percent of the outer surface. Furthermore, the one or more grooved areas are configured to affect traction between the roller body and the tape as the tape passes over the roller body.

20 Claims, 2 Drawing Sheets

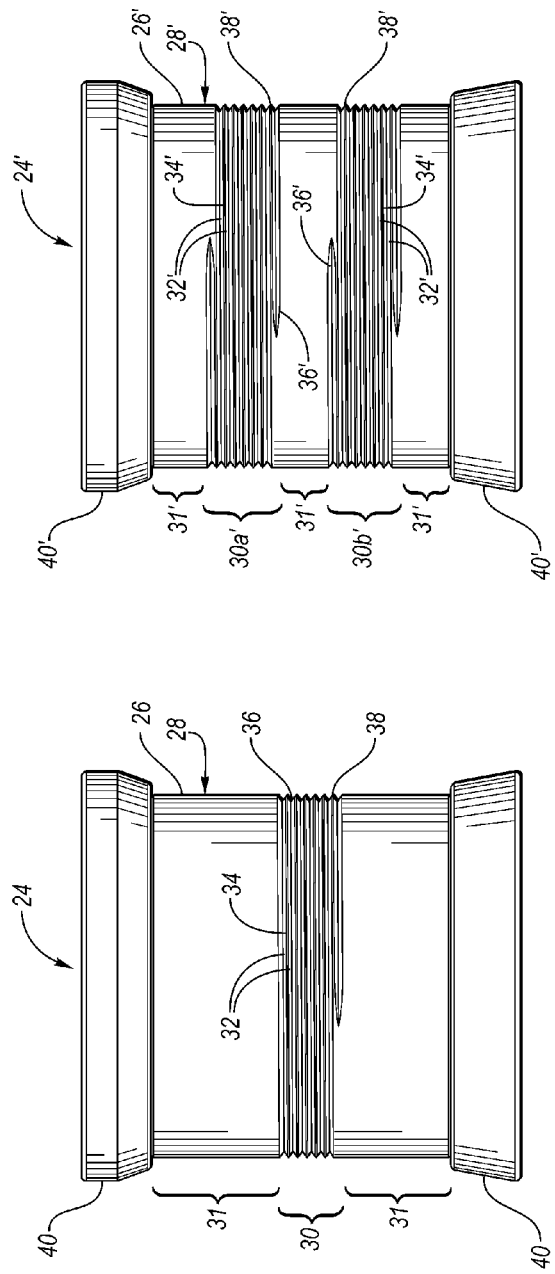
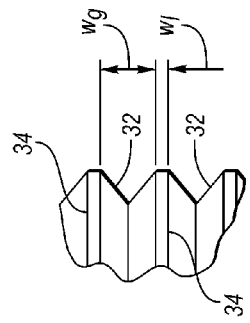

GROOVED TAPE GUIDE ROLLER

TECHNICAL FIELD

The disclosure relates to a tape guide roller for use with a tape drive.

BACKGROUND

Tape guides may be used to guide a tape in a tape drive. Examples of tape guides are shown in U.S. Pat. No. 7,261,250.

SUMMARY

A tape guide roller, according to the present disclosure, is provided for use with a tape drive that is configured to receive a length of tape. The tape guide roller may include a roller body having an outer surface with one or more grooved areas and one or more non-grooved areas, the one or more grooved areas making up seventy-five percent or less of the outer surface, and the one or more non-grooved areas making up at least twenty-five percent of the outer surface. Furthermore, the one or more grooved areas are configured to affect fraction between the roller body and the tape as the tape passes over the roller body.

A tape drive, according to the present disclosure, for use with tape is also provided. The tape drive may include a drive body and a tape guide roller mounted on the drive body. The tape guide roller may include a roller body having an outer surface with one or more grooved areas and one or more non-grooved areas, the one or more grooved areas making up seventy-five percent or less of the outer surface, and the one or more non-grooved areas making up at least twenty-five percent of the outer surface. Furthermore, the one or more grooved areas are configured to affect traction between the roller body and the tape as the tape passes over the roller body.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 2 is a side view of an exemplary configuration for one or more of the guide rollers;

FIG. 3 is an enlarged view of a portion of the guide roller shown in FIG. 2; and FIG. 4 is another exemplary configuration for one or more of the guide rollers.

DETAILED DESCRIPTION

Figure 1:
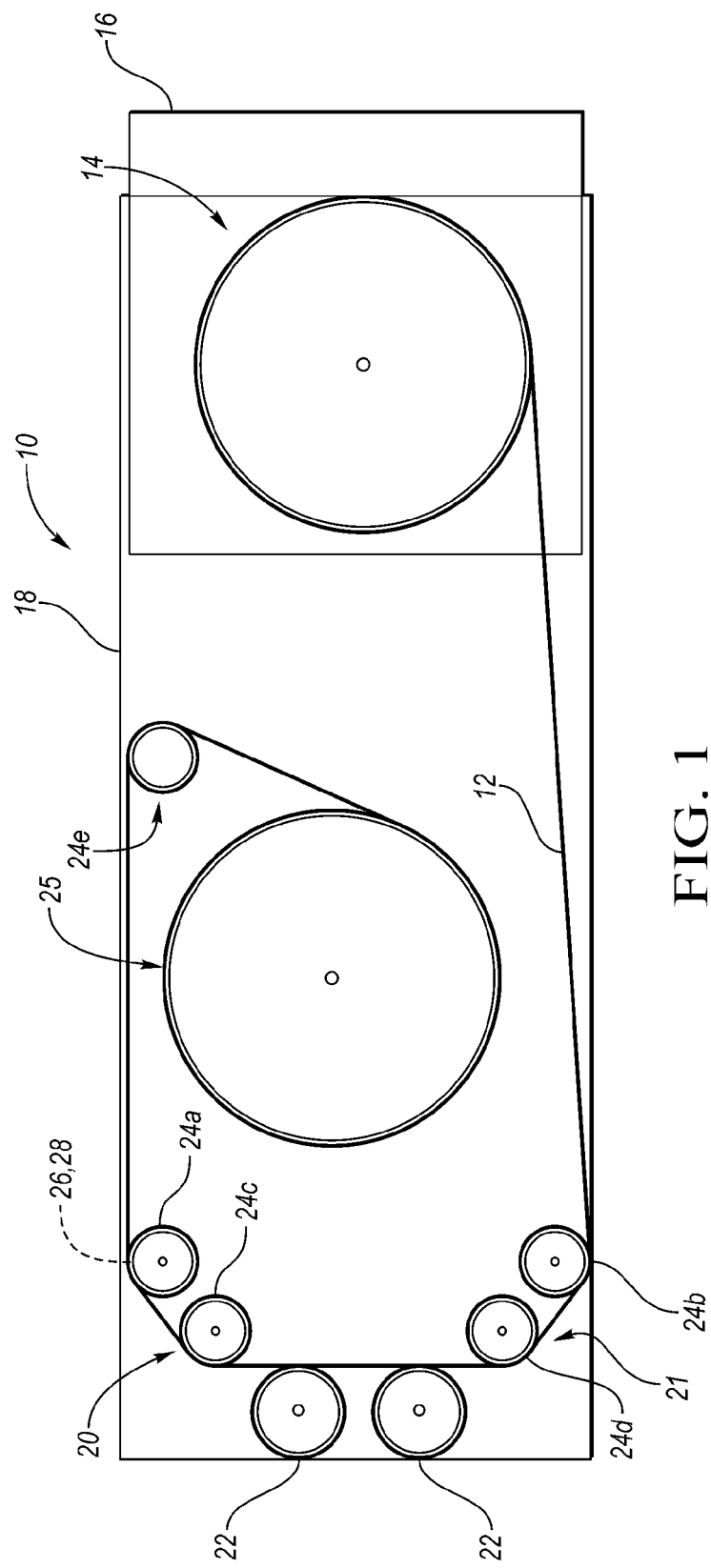
FIG. 1 is a plan view of a tape drive including multiple guide rollers according to the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a data storage device in the form of a tape drive 10, according to the present disclosure, for use with a tape 12, such as a magnetic tape or optical tape. While the tape 12 may be provided in any suitable manner, in the illustrated embodiment, the tape 12 is provided by a cartridge reel 14 of a tape cartridge 16 that is insertable into and removable from the tape drive 10. The tape drive 10 shown in FIG. 1 includes a drive chassis or body 18 configured to receive the tape cartridge 16, a tape guide arrangement 20 mounted on the drive body 18 for guiding the tape 12 along a tape path 21 of the drive body 18, and one or more heads 22, such as magnetic heads or optical heads or pick-up units, for reading data from and/or writing data to the tape 12 as the tape 12 is moved over or adjacent to the heads 22.

The tape guide arrangement 20 may include one or more tape guides, such as tape guide rollers 24, mounted on the drive body 18. For example, each guide roller 24 may be rotatably mounted on a fixed pin or axle that extends from the drive body 18 through the center of the guide roller 24. Ball bearings or the like may also be used to reduce friction and minimize wear between the guide roller 24 and the pin or axle on which it turns.

In the illustrated embodiment, the tape guide arrangement 20 includes first and second outer guide rollers 24a, 24b and first and second inner guide rollers 24c, 24d positioned proximate the heads 22, and a remote guide roller 24e positioned proximate a take-up reel 25 of the tape drive 10. Alternatively, one or more of the guide rollers 24a-e may each instead be configured as a fixed tape guide. Furthermore, one or more of the guide rollers 24a-e may be provided with a novel configuration for providing traction between the respective guide roller and the tape 12 as the tape 12 moves along or over the guide roller. For example, as explained in further detail below, each guide roller 24a-d may include a hub or roller body 26 having an outer surface 28 with one or more grooved areas and one or more non-grooved areas, wherein the one or more grooved areas may make up seventy-five percent or less of the outer surface 28, and the one or more non-grooved areas may make up at least twenty-five percent of the outer surface 28. In one particular embodiment, the one or more grooved areas may make up fifty percent or less of the outer surface 28, and the one or more non-grooved areas may make up fifty percent or more of the outer surface 28.

As explained in greater detail below, the one or more grooved areas may be configured to affect traction between the roller body 26 and the tape 12 as the tape 12 passes over the roller body 26. For example, the one or more grooved areas may provide traction that is generally independent of tape speed over a large range of operating speeds, and the overall traction may be controlled by the design of the one or more grooved areas.

Referring to FIG. 2, an exemplary configuration for the guide rollers 24a-e is shown. In the illustrated embodiment, the guide roller 24 has a cylindrical or tubular hub or roller body 26 having a circular cross-section, for example. The roller body 26 further has a curved outer surface 28 with a central grooved area 30 that makes up less than seventy-five percent of the outer surface 28, and two non-grooved areas 31 that together make up at least twenty-five percent of the outer surface 28. In one embodiment, the central grooved area 30 may make up fifty percent or less of the outer surface 28, and the non-grooved areas 31 may make up at least fifty percent of the outer surface 28. In another embodiment, the central grooved area 30 may make up thirty-three percent or less of the outer surface 28, and the non-grooved areas 31 may make up at least sixty-six percent of the outer surface 28.

Referring to FIGS. 2 and 3, the grooved area 30 may comprise at least two groove sections 32 (e.g., each groove section being a portion of a groove or a groove having a fixed length), and adjacent groove sections 32 may be spaced apart in an axial direction by a land section 34 (e.g., a portion of a land or a land having a fixed length) that has a land width $w_l$ of 0.0085 inches or less. In one embodiment, each land section 34 may have a land width $w_l$ in the range of 0.0015 to 0.006 inches, and each groove section may have a groove width $w_g$ of 0.015 inches or less.

In the illustrated embodiment, the grooved area 30 includes multiple groove sections 32 that cooperate to form a continuous helical groove 36, and multiple land sections 34 that cooperate to form a continuous helical land 38. Furthermore, the helical land 38 has a land width $w_l$ of 0.0085 inches or less, and adjacent groove sections 32 are spaced apart in an axial direction by one of the land sections 34. In another embodiment, the grooved area 30 may be formed without any land sections 34.

Referring to FIG. 4, another exemplary configuration for the guide rollers 24a-e is shown. In the illustrated embodiment, the guide roller 24' has a hub or roller body 26' having an outer surface 28' with first and second spaced apart grooved areas 30a' and 30b' that each make up less than forty percent of the outer surface 28', and three non-grooved areas 31' that together make up at least twenty-five percent of the outer surface 28'. In one particular embodiment, each of the first and second grooved areas 30a' and 30b' may make up thirty percent or less of the outer surface 28', and the one or more non-grooved areas together may make up at least forty percent of the outer surface 28'.

Each grooved area 30a' and 30b' may have the same characteristics recited above with respect to the grooved area 30 of the embodiment shown in FIGS. 2 and 3. For example, each grooved area 30a' and 30b' may have multiple groove sections 32' that cooperate to form a continuous helical groove 36', and multiple land sections 34' that cooperate to form a continuous helical land 38'. Furthermore, each groove section 32' may have the same dimensions as the groove sections 30, and each land section 34' may have the same dimensions as the land sections 34. As another example, one or both of the grooved areas 30a' and 30b' may be provided without any land sections 34'.

In the embodiments shown in FIGS. 2 and 4, each guide roller 24, 24' includes parallel disc-shaped flanges 40, 40' provided at opposite ends of the corresponding roller body 26, 26'. The flanges 40, 40' extend radially beyond the corresponding roller body 26, 26' and may assist in guiding of the tape 12. As another example, each guide roller 24, 24' may be provided without any flanges.

By using any of the above configurations, or any other suitable configuration within the scope of the below claims, each guide roller 24a-e can be designed to effectively control traction between the tape 12 and the respective guide roller 24a-e as the tape 12 travels along or over the respective guide roller 24a-e. For example, by forming one or more roller bodies with one or more grooved areas having relatively narrow land widths, or no lands at all, traction may be provided that is much less sensitive to roller and/or tape speed than prior designs. As a more detailed example, each guide roller 24a-e may be configured to provide tape traction that varies less than 20% over a tape operating speed in the range of 2 to 8 meters/second. Furthermore, by reducing the percentage of the roller body outer surface that is made up of grooved areas compared to prior roller designs, a specific magnitude of traction can be achieved that is sufficient to control lateral tape motion (e.g., motion that is generally perpendicular to the intended direction of tape travel along tape path 21), while minimizing tape edge wear. As a result, lateral tape motion can be effectively controlled over a wide range of tape operating speeds, but without providing too much grip which may result in edge damage to the tape 12.

The design of the guide rollers 24 may also be varied to achieve desired operating parameters for the guide arrangement 20. In this way, the design of each guide roller 24 can be optimized for a particular drive based on such factors as drive layout, type of tape, operating tape speeds, and tape characteristics. For example, with the layout shown in FIG. 1, outer guide rollers 24a, 24b may each be provided with grooved areas 30 near edges of the corresponding roller body 26 (such as shown in FIG. 4) to facilitate intentional steering of the tape 12, while the inner guide rollers 24c, 24d may each be provided with a central grooved area (such as shown in FIG. 2) to minimize steering effect.

Furthermore, configuring one or more guide rollers 24 to provide intentional steering of the tape 12 may be particularly beneficial if the guide arrangement 20 is designed to provide active (e.g., servo-controlled) tape guiding. For example, one or more of the guide rollers 24a-e, such as the outer guide rollers 24a and 24b, may be automatically movable (e.g., tiltable) to adjust the corresponding rotational axis in order to adjust lateral tape position (e.g., tape position transverse to the intended tape travel direction along tape path 21). Configuring such guide rollers to provide intentional tape steering may facilitate adjustment of the lateral position of the tape 12.

Each guide roller 24a-e may be made of any suitable material and in any suitable manner. For example, each guide roller 24a-e having one or more grooved areas may be made of cast or molded metal or molded plastic (e.g., compression or injection molded plastic), and the groove sections of the grooved areas may be formed by a milling operation. Furthermore, each guide roller 24a-e may be made as a single piece, or multiple pieces bonded or fused together. For example, if a particular guide roller is provided with flanges, the flanges may be made separately from the roller body and then subsequently attached to the roller body.

While exemplary embodiments are described above, it is not intended that these embodiments describe all possible forms of the invention. Rather, the words used in the specification are words of description rather than limitation, and it is understood that various changes may be made without departing from the spirit and scope of the invention. For example, a roller body according to the present disclosure may be provided with three or more spaced apart grooved areas. Additionally, the features of various implementing embodiments may be combined to form further embodiments of the invention.

What is claimed is:

1. A tape guide roller for use with a tape drive that is configured to receive a length of tape, the tape guide roller comprising:
   a roller body having an outer surface with one or more grooved areas and one or more non-grooved areas, the one or more grooved areas making up seventy-five percent or less of the outer surface, and the one or more non-grooved areas making up at least twenty-five percent of the outer surface, wherein the one or more grooved areas are configured to affect traction between the roller body and the tape as the tape passes over the roller body.

2. The tape guide roller of claim 1 wherein the one or more grooved areas make up fifty percent or less of the outer surface, and the one or more non-grooved areas make up fifty percent or more of the outer surface.

3. The tape guide roller of claim 1 wherein each grooved area comprises at least two groove sections, and adjacent groove sections are spaced apart in an axial direction by a land section that has a land width of 0.0085 inches or less, such that the tape guide roller is configured to provide tape traction that varies less than 20% over a tape operating speed in the range of 2 to 8 meters/second.

4. The tape guide roller of claim 3 wherein each land section has a land width in the range of 0.0015 to 0.006 inches.

5. The tape guide roller of claim 3 wherein each groove section has a groove width of 0.015 inches or less.

6. The tape guide roller of claim 1 wherein each grooved area comprises a continuous helical groove having a groove width of 0.015 inches or less.

7. The tape guide roller of claim 1 wherein the one or more grooved areas comprise a central grooved area that makes up fifty percent or less of the outer surface.

8. The tape guide roller of claim 7 wherein the central grooved area comprises at least two groove sections, wherein adjacent groove sections are spaced apart in an axial direction by a land section that has a land width of 0.0085 inches or less.

9. The tape guide roller of claim 8 wherein the land section has a land width in the range of 0.0015 to 0.006 inches.

10. The tape guide roller of claim 7 wherein the central grooved area comprises a continuous helical groove having a groove width of 0.015 inches or less.

11. The tape guide roller of claim 10 wherein the central grooved area comprises multiple groove sections that cooperate to form the continuous helical groove, and multiple land sections that cooperate to form a continuous land having a land width of 0.0085 inches or less, and wherein adjacent groove sections are spaced apart in an axial direction by one of the land sections.

12. The tape guide roller of claim 1 wherein the one or more grooved areas include first and second spaced apart grooved areas, and each of the first and second grooved areas makes up less than forty percent of the outer surface.

13. The tape guide roller of claim 12 wherein each of the first and second grooved areas makes up thirty percent or less of the outer surface, and the one or more non-grooved areas together make up at least forty percent of the outer surface.

14. The tape guide roller of claim 12 wherein each of the first and second grooved areas comprises multiple groove sections that each have a groove width of 0.015 inches or less.

15. The tape guide roller of claim 12 wherein each of the first and second grooved areas comprises multiple groove sections that cooperate to form a continuous helical groove having a have a groove width of 0.015 inches or less.

16. The tape guide roller of claim 12 wherein, for each grooved area, adjacent groove sections are separated by a land section, and the land sections of each grooved area cooperate to form a continuous helical land.

17. The tape guide roller of claim 16 wherein each continuous helical land has a land width of 0.0085 inches or less.

18. The tape guide roller of claim 17 wherein each continuous helical land has a land width in the range of 0.0015 to 0.006 inches.

19. A tape drive for use with tape, the tape drive comprising:
a drive body; and
a tape guide roller mounted on the drive body, the tape guide roller including a roller body having an outer surface with one or more grooved areas and one or more non-grooved areas, the one or more grooved areas making up seventy-five percent or less of the outer surface, and the one or more non-grooved areas making up at least twenty-five percent of the outer surface, wherein the one or more grooved areas are configured to affect traction between the roller body and the tape as the tape passes over the roller body.

20. The tape drive of claim 19 further comprising a tape head, an additional tape guide roller mounted on the drive body such that the tape head is located between the tape guide roller and the additional tape guide roller, and first and second outer tape guide rollers mounted on the drive body such that the tape guide roller and the additional tape guide roller are positioned between the outer tape guide rollers, wherein the one or more grooved areas of the tape guide roller comprise a central grooved area that makes up fifty percent or less of the outer surface, wherein the additional tape guide roller includes a roller body having an outer surface with a central grooved area that makes up fifty percent or less of the outer surface, and multiple non-grooved areas that make up at least fifty percent of the outer surface, and wherein each of the outer tape guide rollers includes a roller body having an outer surface with first and second spaced apart grooved areas that each make up less than forty percent of the outer surface, and a central non-grooved area.

* * * * *

UNITED STATES PATENT AND TRADEMARK OFFICE
CERTIFICATE OF CORRECTION

PATENT NO. : 9,042,055 B2  
APPLICATION NO. : 13/934257  
DATED : May 26, 2015  
INVENTOR(S) : Coburn et al.

It is certified that error appears in the above-identified patent and that said Letters Patent is hereby corrected as shown below:

In the claims:

In column 6, line 5, in Claim 16, delete "claim 12" and insert -- claim 15 --, therefor.

Signed and Sealed this  
Fifth Day of July, 2016

Michelle K. Lee  
*Director of the United States Patent and Trademark Office*